(12) United States Patent
Ellsworth

(10) Patent No.: US 8,506,675 B2
(45) Date of Patent: Aug. 13, 2013

(54) COMPOSITE DESICCANT AND AIR-TO-WATER SYSTEM AND METHOD

(76) Inventor: Joseph Ellsworth, Bainbridge Island, WA (US)

( * ) Notice: Subject to any disclaimer, the term of this patent is extended or adjusted under 35 U.S.C. 154(b) by 227 days.

(21) Appl. No.: 13/073,971

(22) Filed: Mar. 28, 2011

(65) Prior Publication Data

US 2011/0232485 A1 Sep. 29, 2011

Related U.S. Application Data

(60) Provisional application No. 61/318,093, filed on Mar. 26, 2010.

(51) Int. Cl.
*B01D 53/26* (2006.01)

(52) U.S. Cl.
USPC .............. 95/10; 95/11; 95/14; 95/91; 95/123; 96/109; 96/118

(58) Field of Classification Search
USPC .................... 95/10, 11, 14, 52, 91, 123; 96/4, 96/109, 111, 112, 118
See application file for complete search history.

(56) References Cited

U.S. PATENT DOCUMENTS

| | | | |
|---|---|---|---|
| 4,242,112 A | 12/1980 | Jebens | |
| 4,341,539 A | 7/1982 | Gidaspow et al. | |
| 4,429,001 A | 1/1984 | Kolpin et al. | |
| 4,447,565 A | 5/1984 | Lula et al. | |
| 4,954,388 A | 9/1990 | Mallouk et al. | |
| 5,078,909 A | 1/1992 | Shigeta et al. | |
| 5,240,472 A | 8/1993 | Sircar | |
| 5,259,869 A * | 11/1993 | Auvil et al. | 95/52 |
| 5,518,761 A | 5/1996 | Hatsuda et al. | |
| 5,632,802 A * | 5/1997 | Grgich et al. | 95/10 |
| 5,702,508 A | 12/1997 | Moratalla | |
| 5,846,296 A * | 12/1998 | Krumsvik | 95/115 |

(Continued)

FOREIGN PATENT DOCUMENTS

| | | |
|---|---|---|
| AU | 2003253771 A1 | 1/2004 |
| CN | 201218628 Y | 4/2009 |

(Continued)

OTHER PUBLICATIONS

Salt in a Porous Matrix Sorbent and Sawdust as Air Driers for Ventilation Systems Journal of Engineering Physics and Thermophysics, vol. 82, No. 2, 2009 Yu. G. Korobeinikov,a A. V. Fedorov,a E. A. Buluchevskii,b and A. V. Lavrenovb 5 pages.

(Continued)

Primary Examiner — Frank Lawrence, Jr.
(74) *Attorney, Agent, or Firm* — George P. White

(57) ABSTRACT

A composite desiccant material is formed by a porous, absorbent substrate of PVA foam or non-woven fibrous sheet is soaked in a solution of a hygroscopic desiccant such as $CaCl_2$. The desiccant is held in pores or fibrous entraining areas sized ranging from 50 microns to 1000 microns. Thin sheets are arranged in a stack in a multi-chamber system, while in an absorption state, uses this stack in a main chamber to absorb $H_2O$ from atmospheric gas flowing through that chamber. In a regeneration state atmospheric flow is stopped and low-grade energy releases the $H_2O$ from the desiccant into that chamber. Fans circulate moist air through the main chamber and into an adjacent chamber for $H_2O$ transfer through or past a partially permeable barrier into a cooling/condensing area. Both $H_2O$ and dry gas may be produced.

8 Claims, 19 Drawing Sheets

(56) References Cited

U.S. PATENT DOCUMENTS

| | | | |
|---|---|---|---|
| 6,336,957 B1* | 1/2002 | Tsymerman | 95/115 |
| 6,364,937 B1 | 4/2002 | McMahon | |
| RE37,779 E | 7/2002 | Kuma et al. | |
| 6,511,525 B2* | 1/2003 | Spletzer et al. | 95/41 |
| 6,559,096 B1 | 5/2003 | Smith et al. | |
| 6,677,258 B2 | 1/2004 | Carroll et al. | |
| 6,719,825 B2 | 4/2004 | Wedge et al. | |
| 6,869,464 B2* | 3/2005 | Klemic | 95/117 |
| 7,005,459 B2 | 2/2006 | Hekal | |
| 7,172,645 B1 | 2/2007 | Pfister et al. | |
| 7,326,363 B2 | 2/2008 | Faust | |
| 7,384,454 B2* | 6/2008 | Tongue | 95/114 |
| 7,407,533 B2 | 8/2008 | Steins | |
| 7,467,523 B2* | 12/2008 | Vetrovec et al. | 62/272 |
| 7,470,311 B2 | 12/2008 | Sueoka et al. | |
| 8,118,912 B2* | 2/2012 | Rodriguez et al. | 95/113 |
| 2004/0031282 A1 | 2/2004 | Kopko | |
| 2004/0060447 A1 | 4/2004 | Powell et al. | |
| 2004/0118287 A1 | 6/2004 | Jaffe et al. | |
| 2006/0156750 A1 | 7/2006 | Lowenstein et al. | |
| 2006/0234585 A1 | 10/2006 | Watanabe et al. | |
| 2007/0028769 A1* | 2/2007 | Eplee et al. | 95/113 |
| 2008/0135495 A1 | 6/2008 | Sher | |
| 2008/0242538 A1 | 10/2008 | Grieve | |
| 2009/0151368 A1 | 6/2009 | Bar | |
| 2009/0211276 A1 | 8/2009 | Forkosh | |
| 2009/0223236 A1 | 9/2009 | Call et al. | |
| 2010/0170499 A1 | 7/2010 | Bar | |

FOREIGN PATENT DOCUMENTS

| | | |
|---|---|---|
| EP | 1566600 A1 | 8/2005 |
| RU | 2169606 C2 | 6/2001 |
| WO | WO0027506 A1 | 5/2000 |
| WO | 03/055595 A1 | 7/2003 |
| WO | WO2008114266 A2 | 9/2008 |

OTHER PUBLICATIONS

Type Salt-in-a-Porous-Matrix Sorbents ISSN 1070-3632, Russian Journal of General Chemistry, 2007, vol. 77, No. 12, pp. 2284 2291 in Hydrocarbon Processing E. A. Buluchevskii, A. V. Lavrenov, and V. K. Duplyakin 8 pages.

A Solar Powered Liquid-Desiccant Cooling System for Greenhouses and Crop Production in Semi-Arid Regions ISHS Acta Horticulturae 797: International Workshop on Greenhouse Environmental Control Authors: G. Lychonos, P.A. Davies 1 page.

Abstract Only—Evaluation of heat and mass transfer coefficients in a gauze-type structured packing air dehumidifier operating with liquid desiccant International Journal of Refrigeration vol. 25, Issue 3, May 2002, pp. 330-339.

Solar sorption cooling systems for residential applications: Options and guidelines R.Z. Wang,1, T.S. Ge, C.J. Chen, Q. Ma, Z.Q. Xiong internationaljournalofrefrigeration 32(2009)638-660.

The use of solar desiccant cooling in the UK: a feasibility study S.P. Halliday a, C.B. Beggs b,, P.A. Sleigh Applied Thermal Engineering 22 (2002) 1327-1338 12 pages.

Written Opinion for PCT/US2011/030230 (corresponding application).

ISR for PCT/US2011/030230 (coresponding application), mailed Dec. 2011.

* cited by examiner

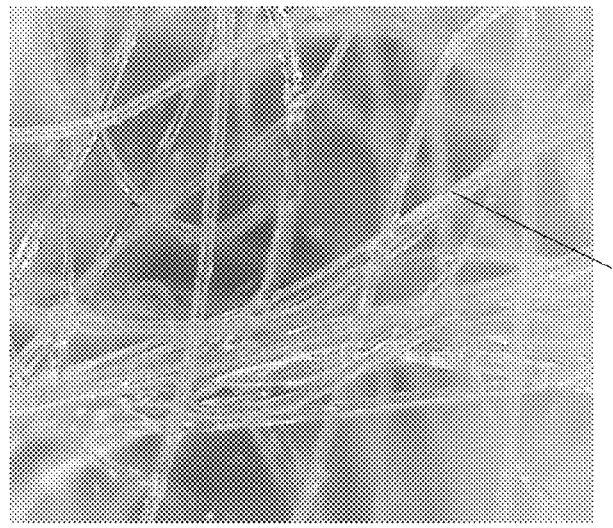
FIG. 3C
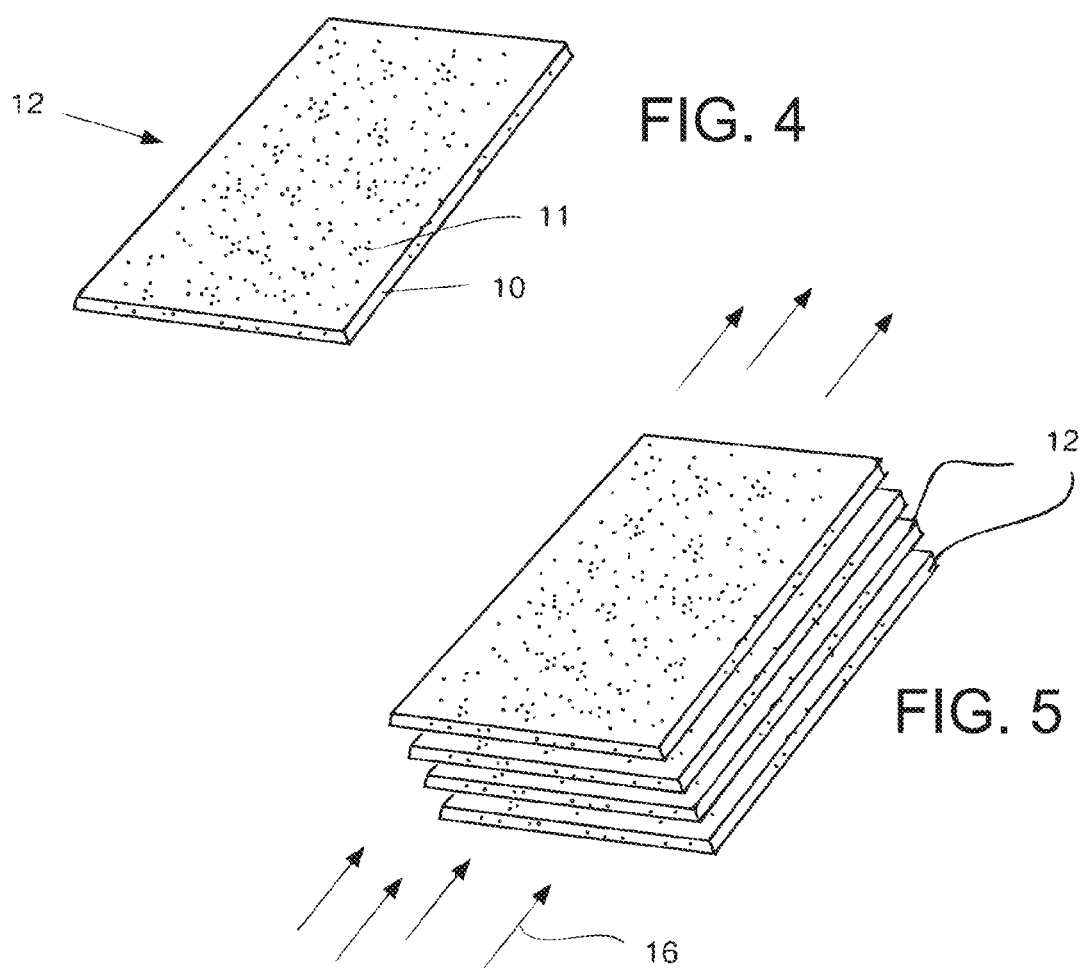

| TO STATE | FROM STATE | | | |
| --- | --- | --- | --- | --- |
| | Quiescent | Charge | Regen | Condense |
| Quiescent | ---- | Battery less than minimum charge<br><br>OR<br><br>Light sensor indicates heating conditions. | Battery less than minimum charge<br><br>OR<br><br>Light sensor indicates non-heating conditions.<br><br>AND Temp in chamber (adjusted for calculated dew point) is less than 5-degree F over ambient or coolant | ----- |
| Charge | Light Sensor indicates Dark or Non-Heating.<br><br>AND Humidity Measured is > than calculated Humidity<br><br>AND Battery is over minimum charge | ---- | ------ | ------ |
| Regen | Battery is over minimum Charge<br><br>AND Temp in chamber is at > 10F over ambient or coolant<br><br>AND light sensor indicates heating conditions. | ----- | ----- | Calculated humidity level in chamber yields dew point lower than 5-degree F over ambient or coolant |
| Condense | ----- | ---- | Humidity > Z<br><br>AND Calculated Humidity Level in chamber allows condensing >= 5-degree F over ambient or coolant<br><u>299</u> | ----- |

FIG. 15

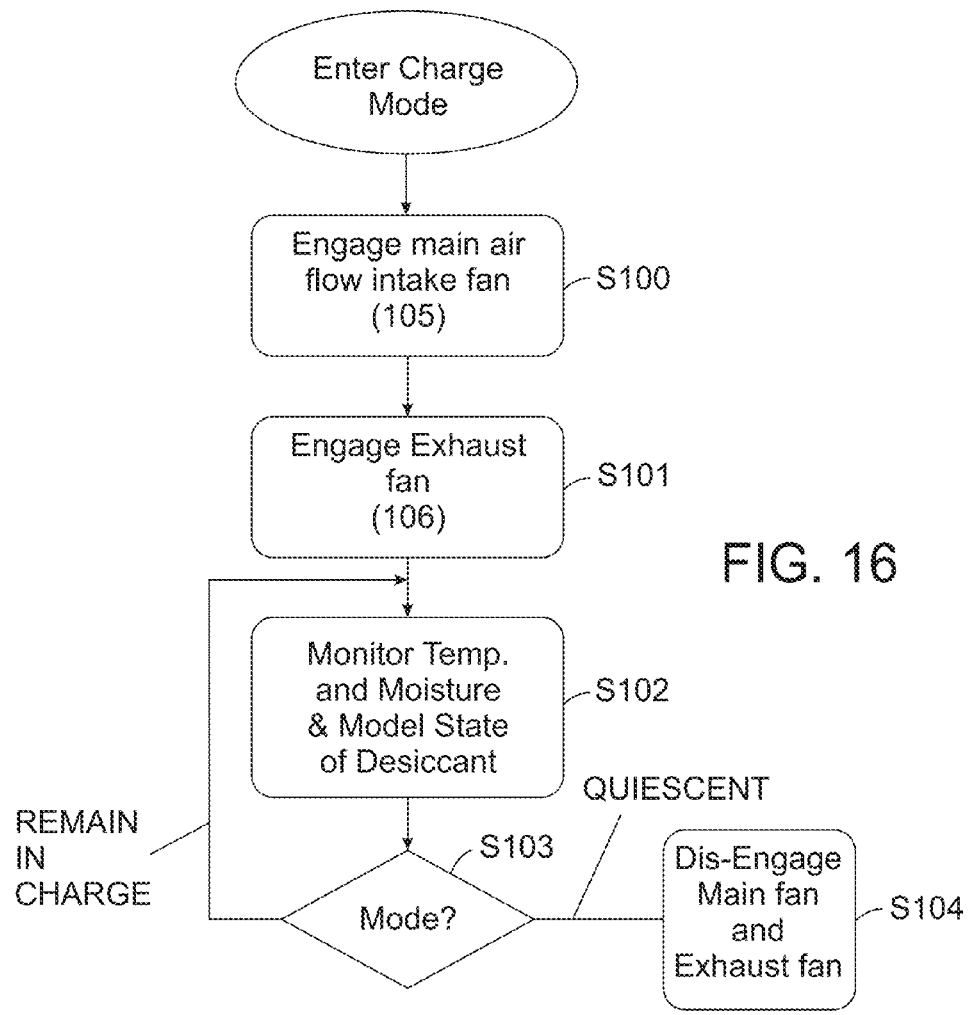

COMPOSITE DESICCANT AND AIR-TO-WATER SYSTEM AND METHOD

RELATED APPLICATIONS

This application claims priority from U.S. provisional application 61/318,093, now pending, filed Mar. 26, 2010, which is hereby incorporated herein by reference in its entirety.

FIELD

The subject relates to materials, methods, and apparatus for extracting water vapor from a gas. Particularly it includes methods and devices related to extracting water from atmospheric air via a hygroscopic material dispersed within an absorbent sheet material of effective form factor for sorption and for regeneration.

BACKGROUND

There are many materials identified as desiccants and many known configurations and systems employing desiccants to dry a gas. Systems include those using a solid desiccant and those using a liquid desiccant. In the case of systems based upon liquid desiccants, many existing concepts increase the exposed surface area of desiccant by spraying the desiccant in a mist. Besides the mechanism and energy required for such schemes the resulting chemical mist might, undesirably, be present in the output gas and output water. Solid forms of desiccant avoid these problems but generally do so at the cost of a relatively small exposed surface area per unit of mass leading to inefficiencies. Solid desiccants can also have relatively long regeneration times.

There is a need for a form of desiccant that provides a high ratio of surface area to mass in a convenient to deploy form factor. Also needed are systems employing such a material to dry a gas, preferably using low-grade energy in an efficient manner.

SUMMARY

Deficiencies in previous desiccant and air-to-water systems can be solved by a desiccant subsystem that can include a stack of spaced-apart thin sorbent sheets of a composite desiccant. The composite desiccant can be a sheet of a porous material with small pores for retaining moisture and larger pores allowing the flow of moist gas within its structure. The composite desiccant material is made up of a substrate of the sorbent sheet that contains dispersed particles of a hygroscopic chemical.

To enhance water retention capacity, the stack can be mounted perpendicular to the direction of gravity or acceleration. This can engender a more even distribution of held water with no low spot for water to collect and drip from.

A system of efficiently extracting water from air can be constructed with the desiccant stack attracting and retaining moisture in air fed to it and through it by fans. A control system can chose to operate the fans when conditions of humidity and the remaining capacity of the desiccant stack are conducive to efficient charging operation. A control system can further initiate a regeneration cycle when the availability of low-grade heat energy and the fullness of the desiccant stack are conducive to efficient regeneration operation. Further, a control system can initiate a condensing mode when the degree of moisture in a regeneration chamber is high enough relative to the temperature of an available cold source for efficient condensing operation. The condensing operation can involve a filter or membrane to differentially engender the passage of water molecules to be condensed versus other warm gases.

BRIEF DESCRIPTION OF THE DRAWINGS

FIG. 3A shows a photomicrograph at a magnification of 400× of a PVA foam with $CaCl_2$ dispersed within its pores, dry;

FIG. 3B shows a photomicrograph at a magnification of 400× of the PVA foam with $CaCl_2$ of FIG. 3A, damp;

FIG. 3C shows a photomicrograph at a magnification of 400× of a non-woven rayon fabric, dry;

FIG. 4 schematically illustrates a sheet of a composite desiccant formed from a PVA foam with disbursed $CaCl_2$.

FIG. 5 schematically shows a stack of desiccant sheets in perspective and an airflow direction;

FIG. 15 is a table showing criteria for transitioning states;

FIG. 16 is a flow chart of the actions of the system of FIG. 10 and FIG. 11 in the charging mode;

DETAILED DESCRIPTION

In conjunction with the included drawings, this detailed description is intended to impart an understanding of the teachings herein and not to define their metes and bounds.

Introduction

One aspect of the present invention is a composite desiccant material in an effective form factor. Another aspect is a desiccant subsystem based upon that composite desiccant material, and a third aspect includes systems and methods of extracting water from air employing the subsystem.

Structure

Desiccant Material and Subsystem

The desiccant composition includes a porous support material and a hydroscopic absorbent dispersed within the porous support material. The porous support material has pores or pore-like small random gaps of a wide range of sizes. Small pores include pores of about 70 microns to large pores of about 1000 micrometers. This porous support material can include a material such as PVA foam or a non-woven fabric such as rayon. The desiccant composition disbursed with the support material includes a hygroscopic absorbent such as $CaCl_2$.

Figure 1A:
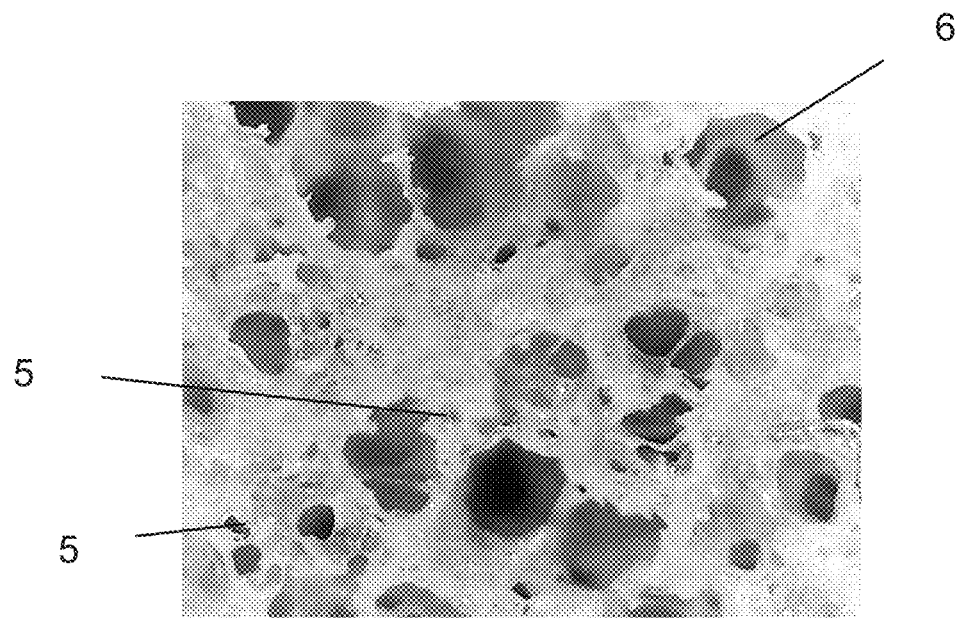
FIG. 1A shows a photomicrograph at a magnification of 400× of a PVA foam dry.
Figure 1B:
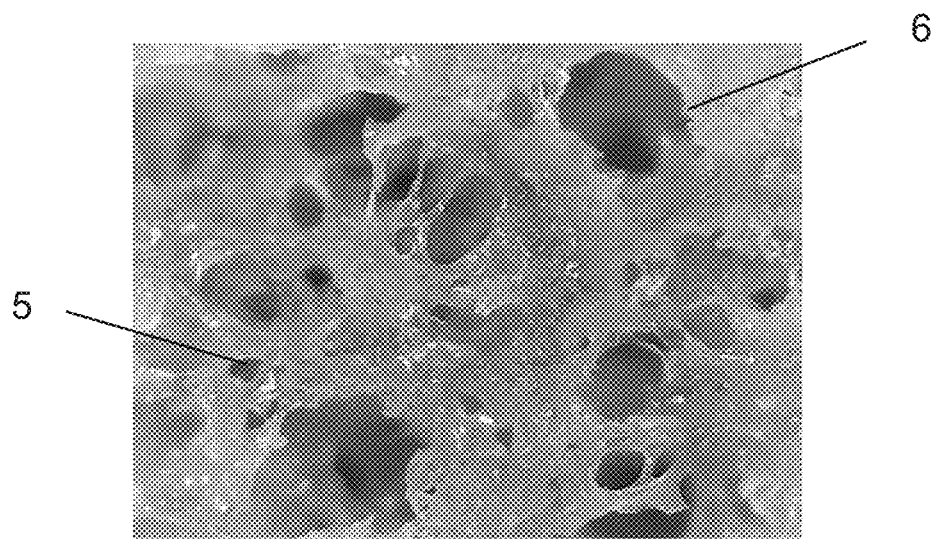
FIG. 1B shows a photomicrograph at a magnification of 400× of the PVA foam of FIG. 1A damp.
Figure 1C:
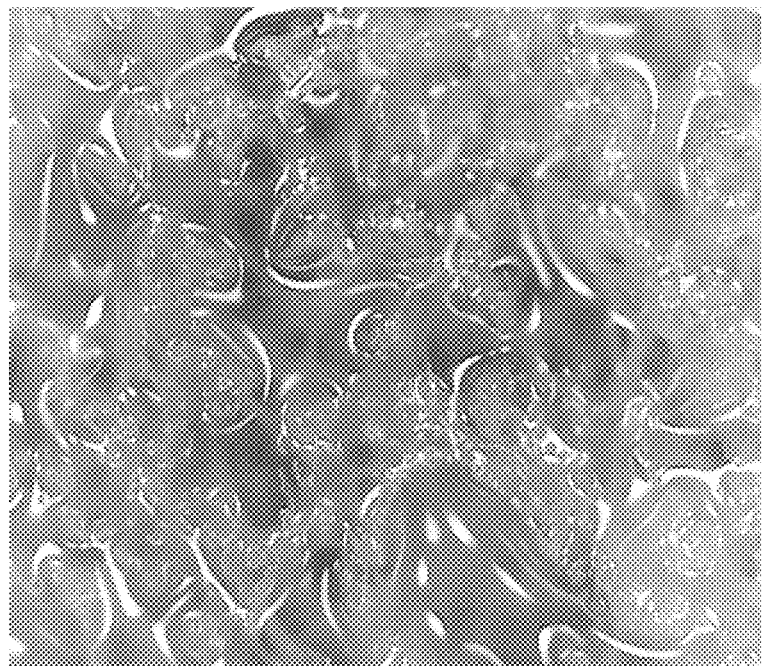
FIG. 1C shows a photomicrograph at a magnification of 400× of the PVA foam of FIG. 1A saturated with water.

Another aspect of these teachings is directed to a method for producing a desiccant composition comprising the steps of: (a) providing a porous support material having a range of pores from 70 micros to 1000 microns; (b) contacting the porous support material with a flowable medium comprising a hygroscopic absorbent, for a time sufficient to substantially fill porosity in the porous support material and then drying the porous support material to remove liquid from the flowable medium and form a desiccant composition comprising the absorbent dispersed on the porous support. A supporting PVA sheet 10, seen in photomicrographs in FIGS. 1A, 1B, and 1C, is a preferred support material. That material then has embedded, but not positionally captivated, particles of a chemically active desiccant.

Appropriate soaking of the porous support material in a liquid solution of a chemical such as $CaCl_2$, Ethyl Glycol, and Lithium Bromide followed by drying the material can be an effective manner of producing such a composite. This is generally taught in Type "Salt-in-a-Porous-Matrix" Sorbents in Hydrocarbon Processing, by E. A. Buluchevskii. This article is found in the Russian Journal of General Chemistry 2007, Vol. 77, pp. 2284-2291. Pleiades Publishing, Ltd., 2007. Other related teachings are seen in U.S. Pat. No. 6,559,096, May 6, 2003, of Smith et. al. In contrast with these and other "salt in a porous matrix" materials, herein is taught a non-captive entrainment of the adsorbent salt in the absorbent material. The desiccant salt particles and brine can migrate within the absorbent substrate due to the larger pores and can be mechanically removed from the substrate.

Figure 2:
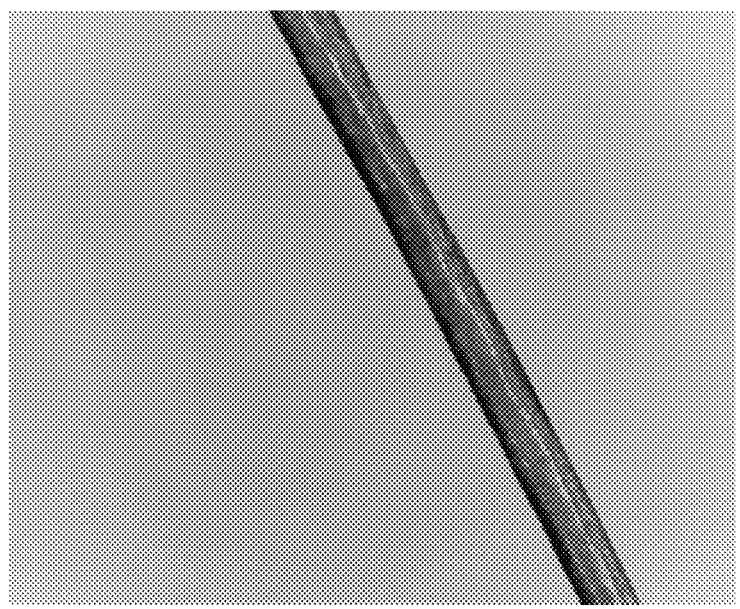
FIG. 2 shows a photomicrograph at a magnification of 400× of a human hair.
Figure 2A:
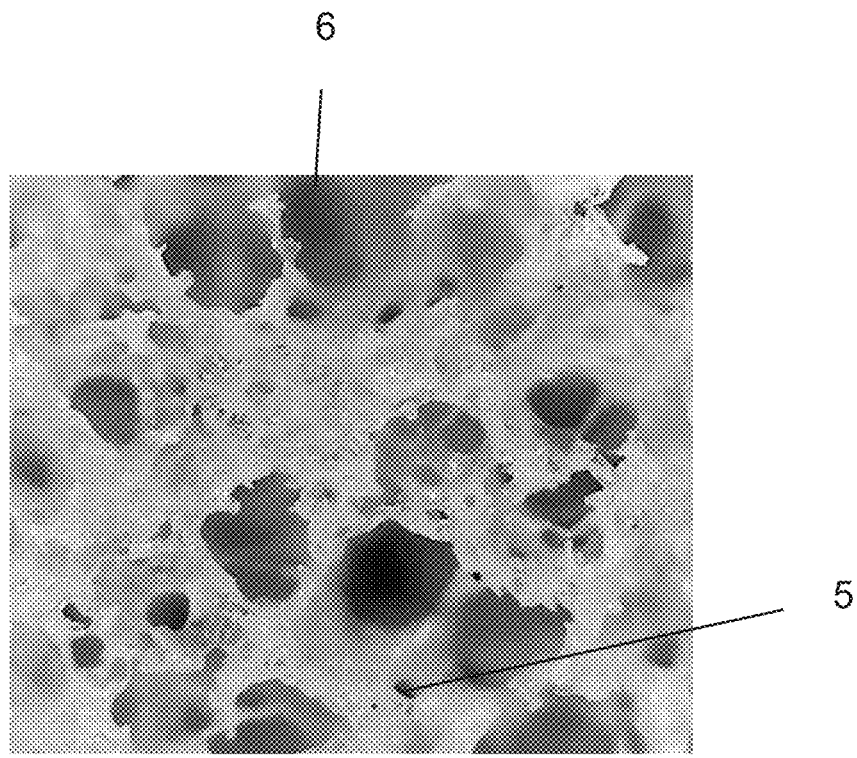
Figure 2B:
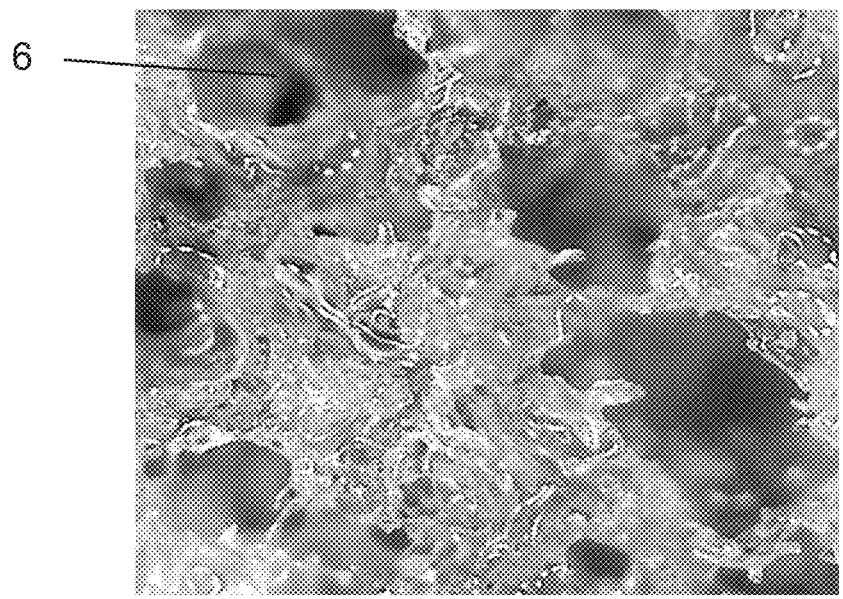

FIG. 1A is a 400× microphotograph of PVA foam in a dry state. The PVA foam used in this example was purchased from Ninbo Goldtime Household Necessaries CO LTD, item SP703-1 called PVA towel 66*43*0.2 cm, dark gray. The pore structure is seen to include both relatively small pores 5 and relatively larger pores 6. In FIG. 1B the same material is shown damp, but not saturated. Generally smaller pores are filled with water, held by surface tension while relatively larger pores are open, allowing the passage of moist air from the environment. The same material is seen in FIG. 1C in a saturated state. Substantially all pores contain brine. For size comparison purposes, FIG. 2 shows a human hair.

The same PVA foam, after the disbursement of $CaCl_2$ by soaking in a solution and then drying, is seen in a dry state in FIG. 3A, and a damp state in FIG. 3B.

FIG. 3C shows a non-woven rayon fabric in a dry state. It has air gaps that effectively act as pores. It has a range of gap sizes formed by the random pattern of threads 8. The particular material tested and shown in FIG. 3C was purchased from Hefei Telijie Sanitary Material Co., Ltd. Their designation is: Nonwoven Cleaning Cloth. Material: Dipping nonwoven fabric; Size: 110 cm width; Length: 50M; Thickness: Around 3.4 mm; Packing: 50M/Roll; G.W.: 69 KGs. Not pictured is another material tested which is: TSV-5, purchased from ShopMicrofiber.com.

The amount of fluid retained in the absorbent material increases as the desiccant absorbs water. It is possible for the amount of fluid to exceed the holding capacity of the absorbent material that can result in dripping of the brine out of the absorbent. The amount of fluid can be maximized if the absorbent is composed in a sheet 12 form as depicted in FIG. 4 and, in use, is oriented with its major plane perpendicular to the vector of gravity. The sheets are generally flexible and should be held in a frame to minimize sagging or the fluid will drip out of the low points. For this composite material to provide a high ratio of $H_2O$ holding capacity to mass, the support material should have particular properties including a rapid rate of absorbing H20, a high capacity for absorbing H20, a rapid wicking of H20, and a rapid drying of absorbed H20. Some materials that have been tested include a PVA foam, a loose weave Rayon fabric, a microfiber fabric, an unwoven fabric, cellulose foams, and various other foams including M11.

Some of these substrate materials as tested by the inventor, have been seen to have the following properties: Total absorption of liquid water into dry media held in horizontal plane ranges from 400% to 1,000% of the weight of the dry 170 media's weight. The media can hold more water when oriented in thin sheets held on a horizontal plane that ranges from 200% to 700% of the amount of water retained when the absorbent sheet is held on the vertical plane.

Thinner sheets with wider gaps present more effective airflow, but yield lower total absorption capacity at higher labor assembly costs. The effective 175 thickness will range from 0.4 mm through 12 mm. Testing has shown that thickness over 12 mm will not regenerate in effective times and also experience an increased incidence of the desiccant collecting in the lower portion of the sheet and dripping out even when the sheet is maintained in the horizontal plane.

Because the absorbent media is not rigid when desiccant is in the fluid state, the airflow rate should be low enough to prevent flapping which would fatigue and eventually destroy the media. Higher airflows can be tolerated by using thicker media and by adding more supports. In general, the maximum airflow effective in embodiments will not exceed 30 MPH gas flow across the media surface.

Chemical Hygroscopic Desiccant

Most testing has been done with $CaCl_2$ as the prime hygroscopic desiccant. Other compounds with hygroscopic properties such as glycol might be used with success. A combination of $CaCl_2$ and glycol has been seen to be advantageous. Lithium bromide, magnesium chloride, and lithium chloride have also been demonstrated as effective desiccants.

Composite Desiccant Element

Soaking the support material in a solution of $CaCl_2$ and then drying the support material can disburse the chemical in the pores and structure of the support material. Other methods to produce the composite are possible. Since a goal of the composite is to maximally expose the surface area of the hygroscopic desiccant to any gaseous $H_2O$ in its environment, the sheets shown are relatively thin. One manner to produce a composite can be to soak a mounted sheet or sheets of a suitable support material in a ridged framework in a solution of $CaCl_2$ and water with an equal weight of water to $CaCl_2$. The maximum $CaCl_2$ that can be absorbed by water is dependent on the temperature of the solution. One way to obtain an effective mixture is to create a solution wherein some $CaCl_2$ settles to the bottom at 65 degrees-F., but at 75 degrees-F. has all the $CaCl_2$ in solution. In addition, it can be desirable to achieve a ratio in a composite of between 5%-300% $CaCl_2$ to the total of $CaCl_2$ plus substrate by weight. The total amount of $CaCl_2$ that is recommended varies upon the conditions of operation. In general, environments that are more humid will require less $CaCl_2$ to reach the point where they have absorbed all of the water possible without excessive dripping.

In dry locations, more $CaCl_2$ can increase absorption. As known to those skilled in the art, and according to Dow Chemical, a supplier of industrial $CaCl_2$, the trend is that at lower humidity $CaCl_2$ will absorb less than it will at higher humidity. Temperature also has an effect on the maximum absorption of $CaCl_2$. As a result, the $CaCl_2$ loading density can be adjusted for local conditions to improve operations. In less humid locations the $CaCl_2$ loading density might be higher and in sufficiently dry locations $CaCl_2$ may remain in its solid form even though it is absorbing water and the process continues to work.

Desiccant Sub-System

Figure 6:
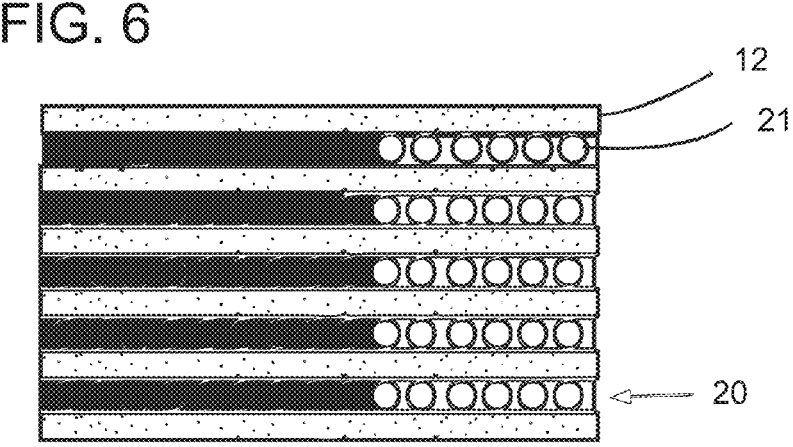
FIG. 6 illustrates, in elevation, a stack of desiccant sheets mounted together by spacers with openings; the stack viewed from the front, air input side.
Figure 7:
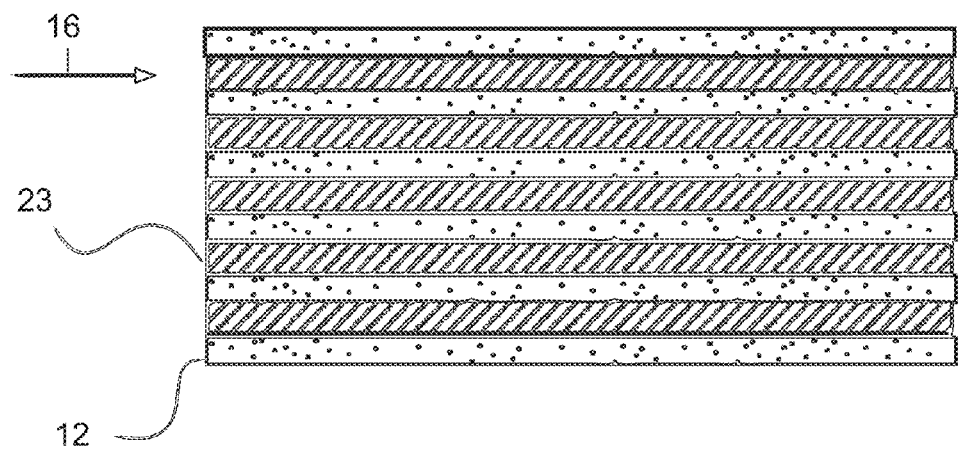
FIG. 7 shows a side view of the desiccant stack of FIG. 6.

As seen in FIG. 5 in a schematic manner, one way to deploy the composite material is as parallel sheets 12 with each sheet parallel to the flow direction 16 of a gas. This configuration exposes both sides of each sheet to the gas. The spacing and other details provided by a supporting structure can be such as to have a higher or lower air resistance to the flow. Thinner gaps between the sheets can increase total absorption per unit volume but may do so at the expense of increased airflow resistance. The gap between sheets might range from 2 mm to 40 mm in some embodiments. The configuration may also be such that a particular degree of turbulence is achieved, affecting the interaction of gaseous $H_2O$ and the desiccant composite sheet. FIGS. 6 and 7 depict an example structure for mounting stacked sheets. In FIG. 6, an end spacer 20, with significant area occupied by openings 21, is used to separate and support the multiple sheets. This might be constructed from a corrugated plastic. The back of this stack is identical to the front. While holes shown in the spacer are circular, they may be any shape. While the spacers are shown on the ends there may in fact be multiple spacers placed periodically along the length of the sheet to prevent sagging of the supported media. There are also one or more similar corrugated strips within the stack to provide intermediate supports. The side supporting spacers 23 are solid on each of the sides of the stack as seen in the side view of FIG. 7. An alternate way to construct the stack is by sandwiching a single spacer sheet with teeth extruded on both sides between each desiccant sheet.

Figure 8:
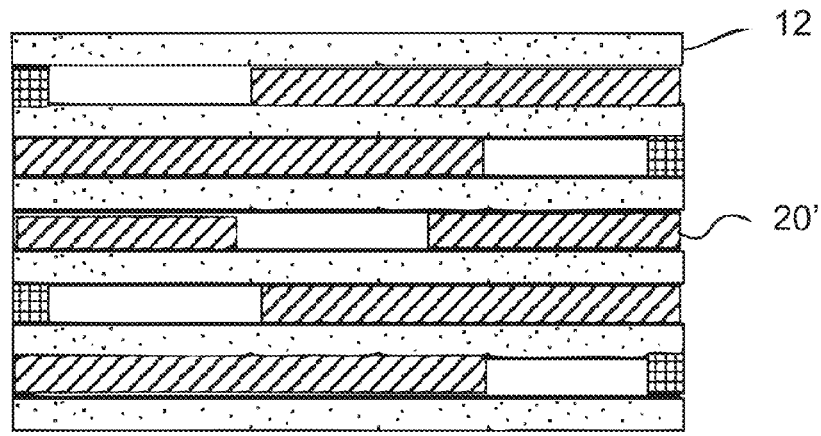
FIG. 8 illustrates an alternative stack of desiccant sheets mounted together by solid spacers that extend partially over the width of the stack viewed from the front, which is the air input side.
Figure 9:
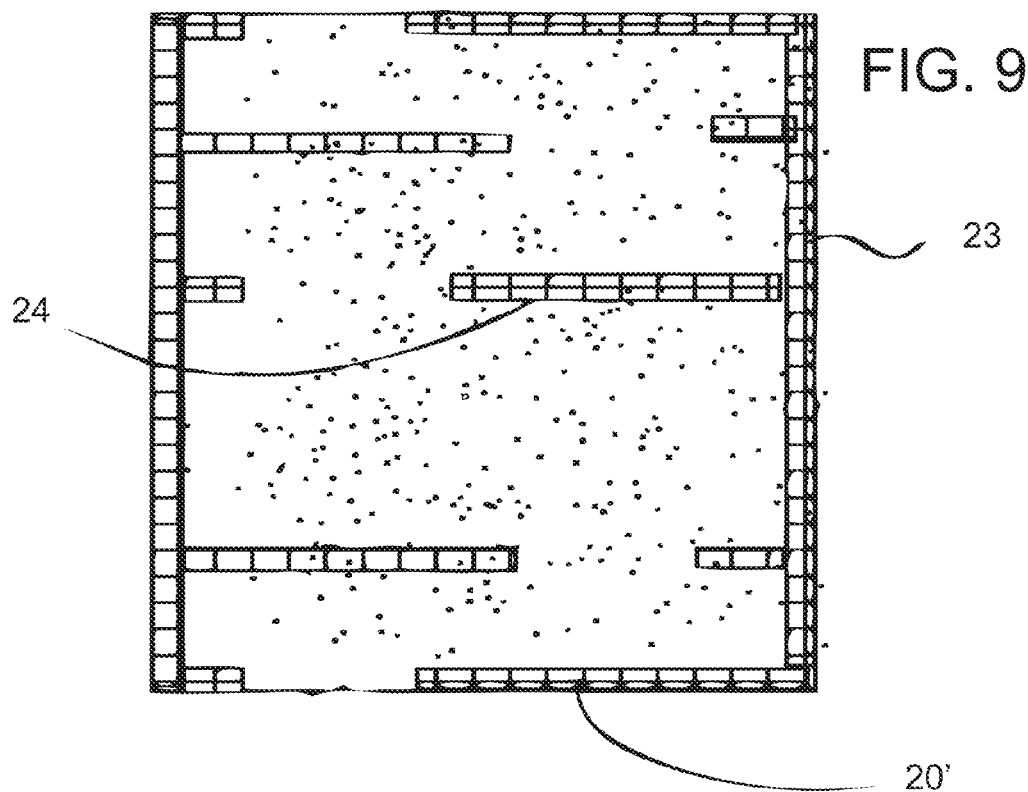
FIG. 9 is a plan view of the stack of FIG. 8 seen with the uppermost sheet removed.

In some versions, as seen in the front view of FIG. 8 and the plan view of FIG. 9 (the top sheet is removed), one or more baffles 24 can be used to create a turbulence-enhancing air path between the sheets. Those skilled in the art will recognize many alternate structures for supporting the parallel sheets and engendering a desired trade-off between pressure drop and a desired turbulent interaction. Material thickness of the desiccant substrate is predominantly limited by the material's moisture holding characteristics when oriented in a horizontal plane. Another factor for thickness determination is the rate of absorption.

A thicker sheet might be appropriate for a material with faster wicking and absorption. If the material is too thick it may then accumulate a saturating degree of fluid in its lower portions leaving the upper portions drier and can result in dripping. Overly thick sheets would also make inefficient use of the desiccant by weight and by volume. In general, the thickness of the material is chosen to allow the maximum absorption in a given environment consistent with the average 250 charging time. For an overnight charging system, a thickness from 2 mm through 10 mm can be effective. For a system delivering multiple batches per day, a material thickness as thin as 0.5 mm may be more effective. In systems for continuous drying of a gas, a sheet thickness of 0.1 mm to 0.5 mm and a spacing of between ½ and 1 times the thickness may be advantageous. Sheet spacing in embodiments with longer airflow channels may generally have wider gaps to maintain a particular flow at a desired low degree of pressure. Shorter channel systems can have lower gaps and maintain a comparable pressure drop. In practice, a spacing of between 1/64" and 2" would cover many applications. A narrower practical range, taking material sag and volume constraints into consideration, can be 1/16" to ½". A smaller gap can be advantageous in allowing more sheets and therefore more desiccant mass in a given volume.

Those skilled in the art will understand that various mountings and stiffening schemes are available with different tradeoffs. Sheets used in a subsystem may be pre-dried and tested for dripping to a desired specification. A system could take advantage of that to cease operating in an absorption mode with a desired margin before dripping was likely to occur. In some cases, it may be advantageous to construct a stack of the substrate material and then soak the subsystem. In other cases the composite sheets might be created and then assembled into a stack. Systems can be manufactured oversaturated with desiccant that is then removed by operation on-site to allow for environmental differences at various sites. One implementation approach is to assemble the subsystem with untreated absorbent media and then soak the subsystem in the desiccant solution. The desiccant charge would then likely be substantially over-charged. The subsystem can then be conditioned in an environment that approximated the humidity and temperature 275 expected to occur in a target deployment location. This conditioning step allows the desiccant charge to absorb the maximum water it is likely to absorb in the field and allows excess solution to drip out to be re-used. The unit is then dried.

Operation

Desiccant Subsystem

The $H_2O$ holding capacity of the subsystem is affected by various factors 280 including the support material, the chemical desiccant, the sheet thickness, and the number of sheets. In addition, as the amount of $H_2O$ nears the capacity of the material, the liquid will appear at the surface and may drip. By keeping the sheet-stack parallel to the ground, the capacity before dripping that occurs is increased. Some mounting arrangements may provide a leveling indication and some may provide a leveling adjustment for the subsystem while others may provide a leveling indication and adjustment at the system level. In alternate inertial environments, the mounting orientation could be dynamically altered in order to maintain a perpendicular relationship with the vector of gravity/acceleration.

Structure

Air-to-Water System

Figure 10:
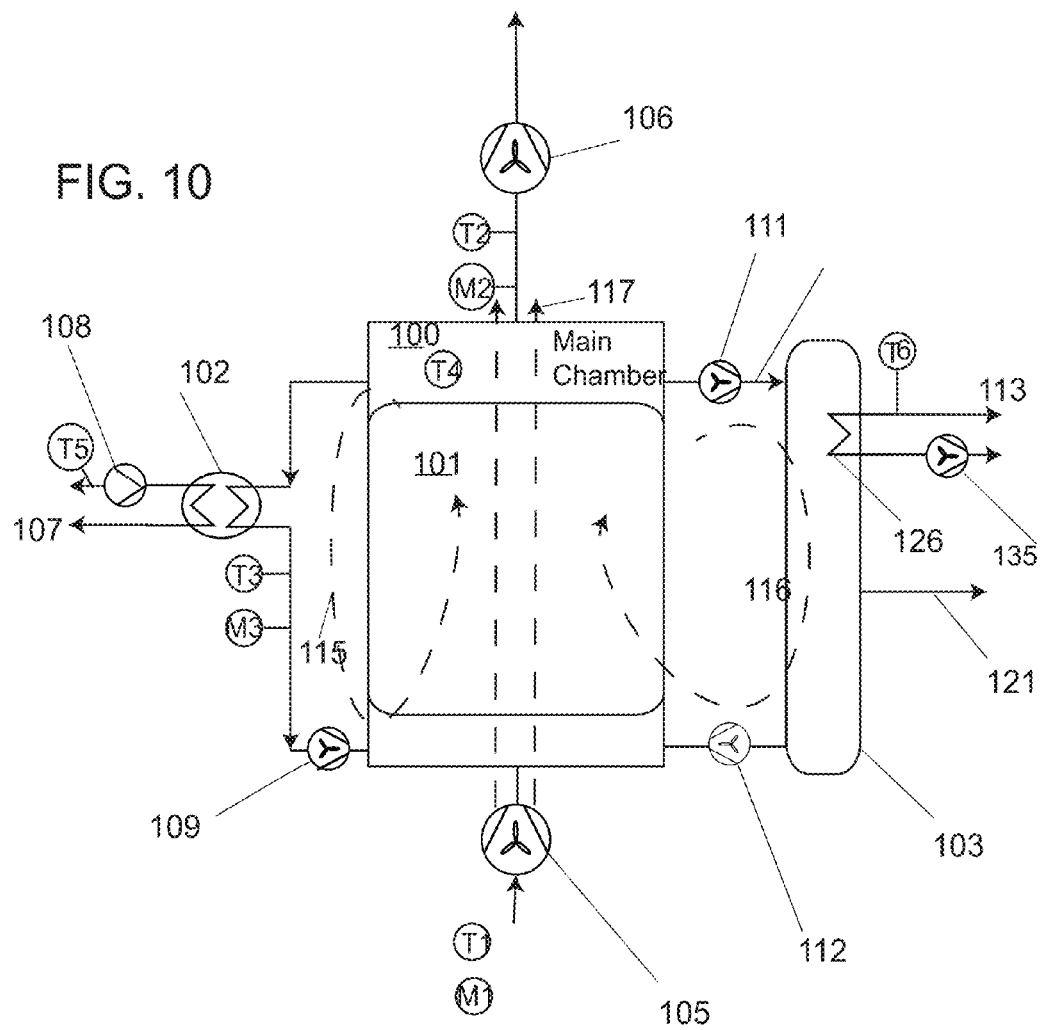
FIG. 10 is a schematic diagram of a system for extracting water from air showing the air circulation patterns in three distinct modes.

A schematic view of an example air-to-water system is shown in FIG. 10. Its structure includes a main chamber 100 containing a desiccant subsystem 101. It also includes a heat exchanger 102 to provide energy in the regeneration phase and a condensing chamber 103 to harvest water freed during regeneration. There are three primary airflow paths (1) ambient in, dried air out 117 (2) recirculation hot air for regeneration 115, and (3) recirculation of moist air through a condenser 116. Fans engender the flows. Flaps (not shown in FIG. 10) associated with each of the three airflow patterns, respectively, prevent undesired flow. The system shown includes both temperature and moisture sensors in various locations.

An intake fan 105 can direct ambient air into the desiccant chamber and an exhaust fan 106 removes the dried air. Temperature T1 T2 and moisture M1 M2 sensors allow for measurement of the intake and exhaust air respective properties.

A source of heat 107 that might be hot water from a solar panel, or might be from a low-grade waste heat source is connected to the heat exchanger 102 to allow heating of recirculating airflow 105 through the desiccant subsystem 101 in the main chamber 100. In applications that produce drinking water, the metallic components of the heat exchanger 102 can be constructed from stainless steel. A pump 108 is shown in the hot water path. A regeneration flow fan 109 is in the recirculation airflow path that goes through the heat exchanger and the desiccant chamber.

Condensing occurs in a condensing chamber 103 that is coupled to the main chamber via two fans in the system of FIG. 10. One fan 111 is pulling air from the desiccant chamber while the second, exit fan 112, is pulling air through the condensing chamber and back into the main chamber and through the desiccant subsystem 101. A source of cooling 113 is provided to the condensing chamber coupled by a heat exchanger 126 and water is produced at a drain outlet 121.

Figure 11:
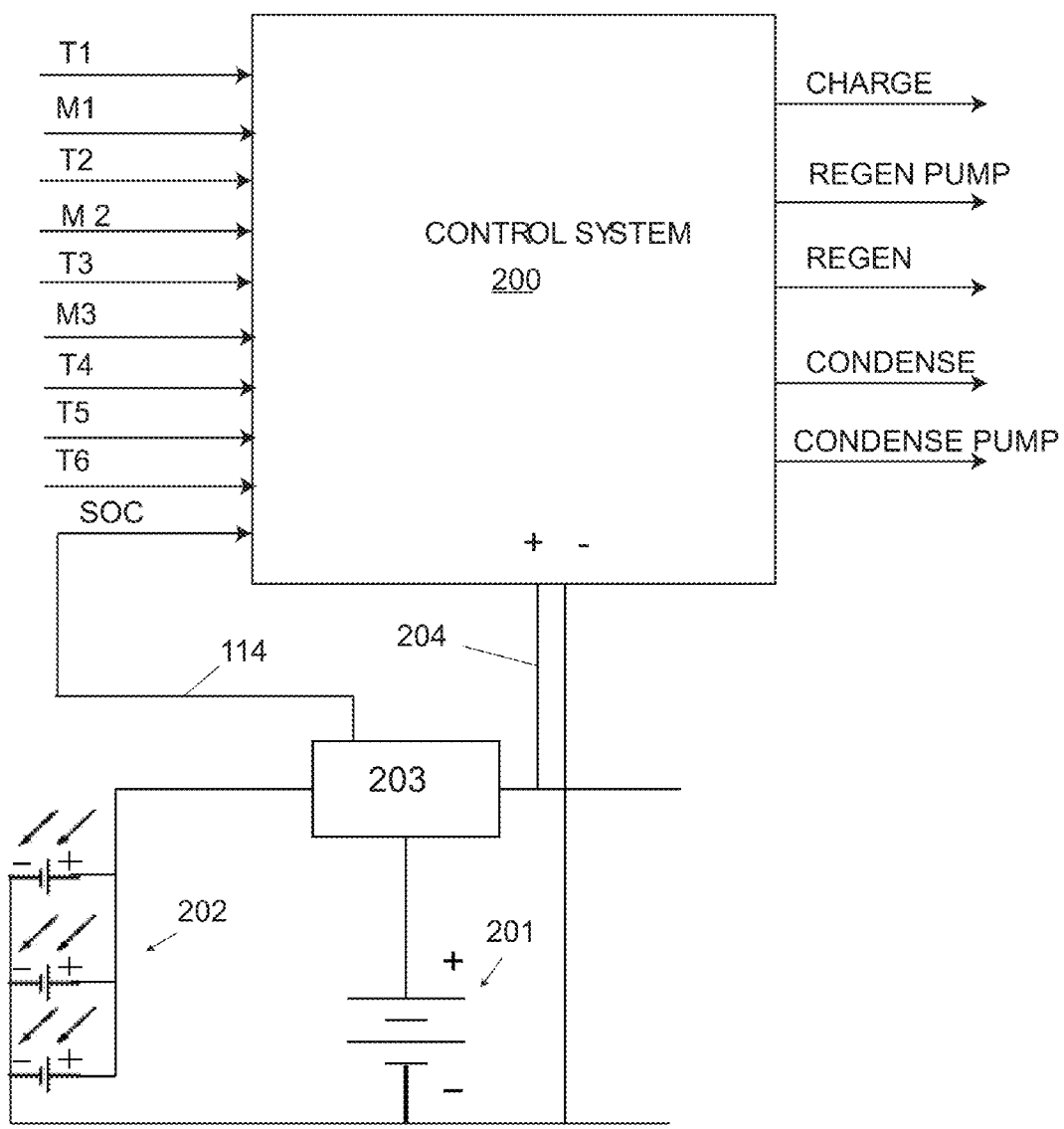
FIG. 11 is a block diagram view of a control system for an air-to-water system.

A control system 200 is shown schematically in FIG. 11. The temperature and moisture sensors seen in FIG. 10 provide inputs to the control system. Another input is the state of charge 114 of the battery 201. The control system's various outputs signal the various phases of operation, enabling fans and pumps.

Operation

Air-to-Water System

A goal of many embodiments of these teachings is to produce drinking water from ambient air under a variety of conditions with a minimal expenditure of energy. In a typical operation cycle, photovoltaic panels 202 charge a bank of batteries 201 during the day.

At night, the system might start out in a quiescent state, neither charging, regenerating, nor condensing. From past operation, the control system has a stored value representative of the extent of $H_2O$ held in the desiccant subsystem. The stored electrical energy in the battery is used conservatively. The control system makes decisions based upon the degree of moisture in the ambient air measured by sensor M1, the temperature of the ambient air measured by sensor T1, the extent of H20 presently held in the desiccant subsystem 101, and the state-of-charge 114 of the batteries. The intake 105 and exhaust fans 106 are energized to further charge the desiccant only when "it is worth it". That is, if a modeling of the system by the control logic indicates that there will be an adequate addition to the held H20 by taking in ambient air, the CHARGE signal will be activated. This will engage both the intake fan 105 and the exhaust fan 106. This mode will stay in operation so long as the control systems models, according to predetermined rules, that further operation meets a criterion of efficiency. The other flow patterns are inactive and blocked by closed flaps.

When the held $H_2O$ in the desiccant subsystem 101 is at the maximum or if the ambient conditions are such that no charging or an ineffective degree of charging would take place, the charge mode ceases. In a system using solar water heating as its regeneration energy source, the temperature of the hot water source as measured by the sensor T5 will increase as the day goes on and the sun rises. To conserve battery power, the control system will not initiate regeneration mode until the hot water has achieved a temperature level that can efficiently cause regeneration of the desiccant. This computation is based on the present state of the desiccant chamber. When the criteria are met, the control system will energize the REGEN signal.

In regeneration mode the hot water source pump 108 is engaged as well as the fan that engenders the regenerating flow pattern 115. That pattern is through the heat exchanger 102 and through the desiccant subsystem 101 in a closed-circuit manner. In this mode the other patterns of flow are inactive and blocked by flaps. The regeneration mode's function is to release held $H_2O$ out of the desiccant and into the atmosphere of the main chamber. This mode is continued as long as the heat provided through the heat exchanger is continuing to effectively release additional $H_2O$. One parameter involved with this calculation is the humidity or moisture content of the atmosphere within the main chamber 100. While this may be measured directly, the harsh conditions in this system have proven to be destructive to the useful life of many conventional sensors. In the system of FIG. 10 and FIG. 11, only a temperature sensor T4 is located in the main chamber. In that example system, the moisture level within the closed chamber is determined by modeling the system, starting with the known state of the amount of $H_2O$ held in the desiccant and taking into account the input ambient air, output air and the degree of heat energy injected via the regenerative flow and amount of moisture condensed.

The condensing mode is entered when the atmosphere within the main chamber 100 is sufficiently saturated as to be effectively condensable given the temperature delta between that of the main chamber and that of the cold source 113 whose temperature is measured by a temperate sensor T6. When the criteria are met, the control system will activate the CONDENSE signal. If a criteria set according to predetermined rules is met, the control system will enter the condensing mode. In this mode, energizing the condensing flow fans 111 112 will engender the condensing air pattern. Closed flaps prevent the other airflow patterns.

This condensing airflow pattern 116 is a recirculation flow through the desiccant subsystem 101 and the condensing chamber 103. Due to the temperature drop provided by the cold source, water condenses and is available to exit the chamber at a drain point 121. This mode is continued as long as the moisture level on the main chamber and the temperature difference between the main chamber and the cold source 113 provide for effective continued production of water.

Figure 12:
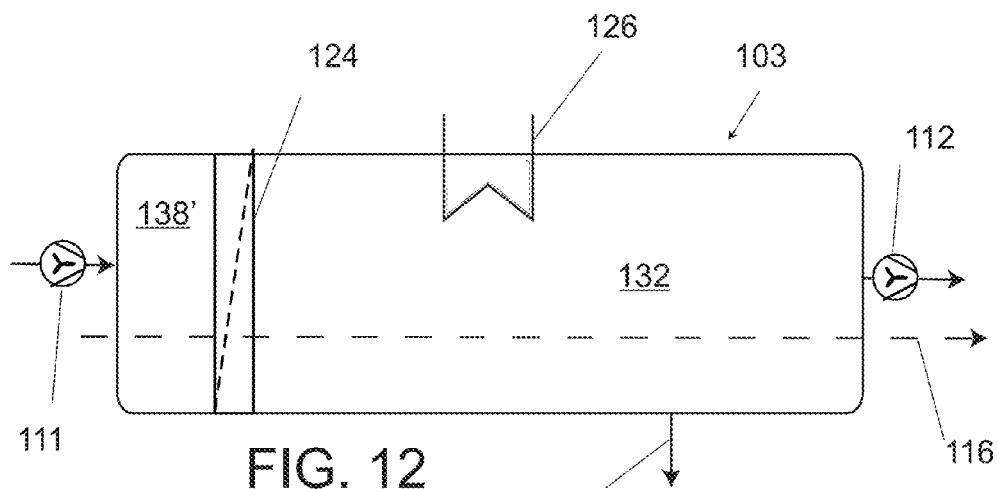
FIG. 12 is a schematic diagram of a condenser portion of the system of FIG. 10 with a filter.

FIG. 12 shows a more detailed schematic of the condensing chamber 103 and its entrance and exhaust fans of this first example system. Air is pulled from one end of the main chamber by an entrance fan 111 and pushed back into the other end of the desiccant chamber by the exit fan 112. Within the condensing chamber 103 the hot moist air first enters a separation area 138 and then a portion of the moist air passes through a filter 124. In this example system it is a HEPA filter. One purpose of the filter 124 is to prevent particulate contamination of the water being produced. The $H_2O$ is condensed in the condensing region 132 from the air via a heat exchanger 126 connected to a cold source. This might be a fluid pumped through a ground loop, ambient air, or other source of relative coldness. The condensed water is available at a drain point 121.

Alternative System Embodiments

Alternative Condensing Chamber—with Membrane

Figure 13:
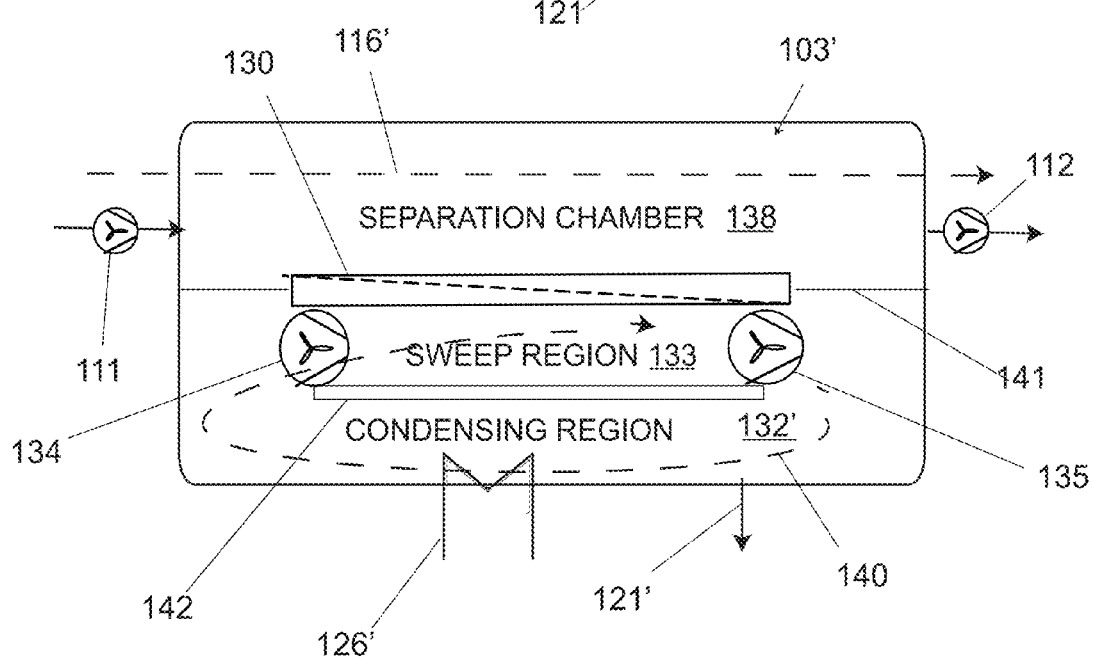
FIG. 13 is a schematic diagram of an alternate condenser portion of the system of FIG. 10 with a membrane.

FIG. 13 shows a schematic view of an alternative condensing chamber 103'. In this version a membrane 130 separates an initial separation region 138 from the actual cold condensing region 132'. Rather than direct the recirculating air pattern through the condensing region itself, the recirculation is done in the separation sub-chamber with the path having a sidewall 141 comprising an $H_2O$ permeable membrane 130. The recirculation flow 116' is parallel with the length of the membrane rather than being directed to the membrane.

On the opposite side of the membrane 130 is a sweep region 133. On the side of the membrane opposite to that abutting recirculating flow, two sweep fans 134 135 direct airflow 140 in parallel to the membrane. The sweep region is a plenum defined by the membrane and a plenum wall 142. $H_2O$ molecules will permeate the membrane assisted by the turbulent flows on both sides. However, the other components of the hot moist air will not substantially permeate the membrane. This provides multiple benefits. One is that there is a minimum of mass heat transfer from the hot side of the membrane to the condensing side of the membrane. While it is necessary to cool the $H_2O$ water vapor to condense it to liquid water, it is desirable that the bulk of the recirculating flow 116' not be cooled since it is being fed back into the main chamber 100. The main chamber must be kept hot in order to keep the $H_2O$ in its atmosphere rather than in the desiccant.

A second benefit of the membrane version is that a partial vacuum is created as the $H_2O$ expands on the sweep region 133 side of the membrane. This pressure differential further enhances the flow of $H_2O$ molecules through the membrane. Several materials can be used in the composition of a suitable membrane. One is Nafion. An alternate material that has been successfully tested is a monolithic urethane material, part number PT1700S by Deerfield Urethane. The sweep flow circulates through the sweep region 133 and back through the actual condensing region 132. There the flow is in communication with the cold source via the heat exchanger 126'.

Method of Operation

Figure 14:
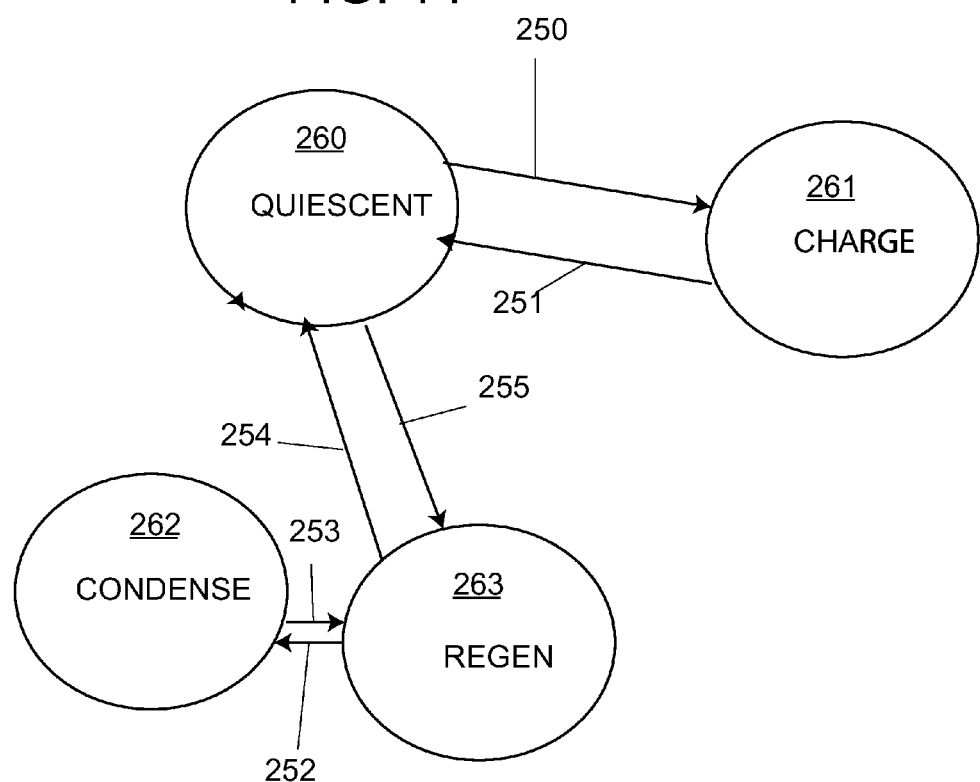
FIG. 14 is a state diagram of the states of the control system of FIG. 11.

FIGS. 14-19 show states, criteria, and steps involved in the operation of the system of FIGS. 10-13. In FIG. 14 a state diagram illustrates the four major states of the system: Quiescent 260, Charging 261, Regenerating 263 and Condensing 262.

While in the Quiescent 260 state:
(a) Detection of high moisture content in the ambient air with a remaining water holding capacity of the desiccant subsystem 101 is a condition that will cause a transition 250 to the Charge state 261.
(b) Detection of significant held water in the desiccant subsystem in conjunction with a sufficient source of low-grade heat is a condition that will cause a transition 255 to the Regen state 263.

When in the Charge state 261:
(a) Detection of low moisture content in the ambient air OR a low remaining water holding capacity of the desiccant subsystem is a condition that will cause a transition 251 to the Quiescent state 260.

When in Regen state 263:
(a) Detection of insufficient low-grade energy to efficiently release moisture from the desiccant subsystem will cause a transition 254 to the Quiescent state 260.
(b) Detection of significant held water in the desiccant subsystem in conjunction with a sufficient source of low-grade heat is a condition that will cause a transition 252 to the Condense state 262.

When in Condense state 262:
(a) Detection of insufficient moisture in the main chamber 100 will cause a transition 253 to the Regen state 263.

State Transition

Various conditions detected by logic and system state modeling in the control system 200 cause state transitions. The state transition logic is shown in the state table FIG. 15.

The box for the criteria for moving from regeneration to condensing mode 299 requires additional explanation. When using waste heat or split collectors then rather than measuring light sensor for heating conditions this simply measures input of heating fluid.

Calculated dew point of humidity in the chamber, Z, is based on the calculated dew point, humidity, and temperature of the highest 2-hour average humidity as measured in input air during prior charge period. This is used to calculate a minimum temperature delta between the ambient temperature and the condensing dew point. This is used as the minimum condensing delta. Minimum condensing Delta is increased by a set constant such as 10-degrees F. for each hour regeneration is run, to allow for reduced humidity available in desiccant because of water reclaimed. The adjustment per hour is tuned for local conditions and known over-sizing of desiccant stack. Larger oversized desiccant stack will allow a lower increase per hour while smaller desiccant stacks will require a higher increase per hour.

Charge Mode

In FIG. 16 the steps of Charge mode are seen. First, the main intake and exhaust airflow fans or blowers are energized and engaged S100 S101. Then a loop is entered where the temperature sensors and moisture sensors are monitored and the information used to continually update a model of the state of the desiccant subsystem and the relative humidity of the chambers S102. Within this loop, the criteria described above regarding causes of state transitions is reevaluated S103. If the conditions are such as to cause a transition to the Quiescent state, the main intake and exhaust fans are disengaged and the Quiescent state is entered S104. If no transition is called for by the conditions, the loop continues.

Condense Mode

Figure 17:
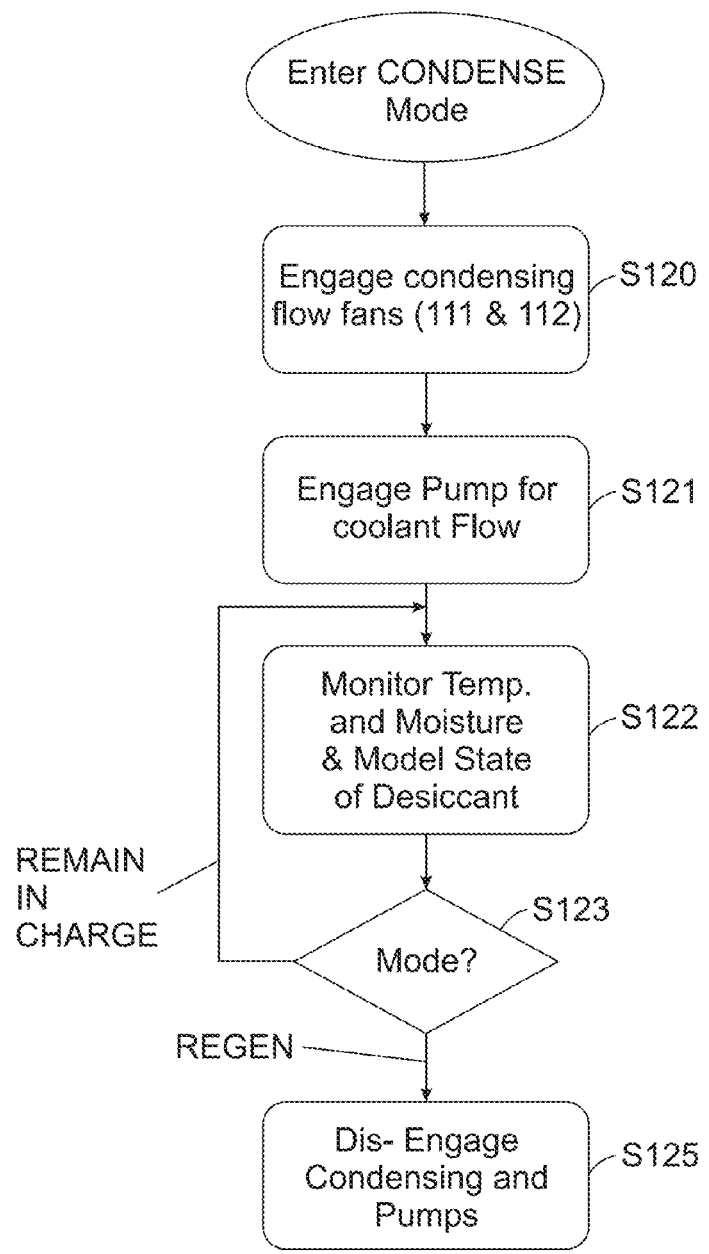
FIG. 17 is a flow chart of the actions of the system of FIG. 10 and FIG. 11 in the regeneration mode.

In FIG. 17 the steps of Condense mode are seen. First the condensing entrance 111 and exit fans 112 are engaged S120, and the coolant flow pump 135 to cause cold water to flow through the heat exchanger 126 is engaged S121. Then a loop is entered where the temperature sensors and moisture sensors are monitored and the information used to continually update a model of the state of the desiccant subsystem and the relative humidity of the chambers S122. Within this loop, the criteria described above regarding causes of state transitions is reevaluated S123. If conditions dictate a transition to the Regen state, condensing entrance and exit fans and coolant flow pump are dis-engaged, and the Regen state is entered S125. If no transition is called for by the conditions, the loop continues.

Quiescent Mode

Figure 18:
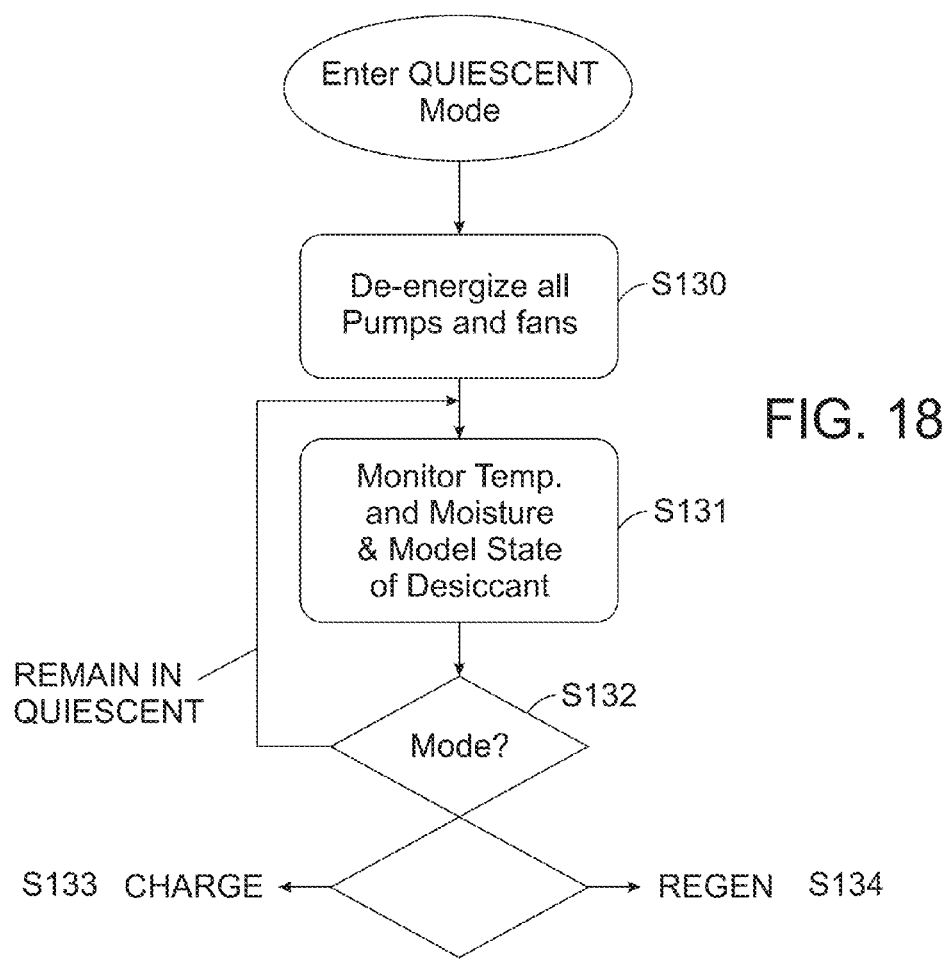
FIG. 18 is a flow chart of the actions of the system of FIG. 10 and FIG. 11 in the condensing mode.

In FIG. 18 the steps of Quiescent mode are seen. First the all pumps and fans are disengaged S130. Any flaps are closed. Then a loop is entered where the temperature sensors and moisture sensors are monitored and the information used to continually update a model of the state of the desiccant subsystem and the relative humidity of the chambers S131. Within this loop the criteria described above regarding causes of state transitions is reevaluated S132. If the conditions are such as to cause a transition to the Charge state, that state is entered S133. If conditions dictate a transition to the Regen state, that state is entered S134. If no transition is called for by the conditions, the loop continues.

Regen Mode

Figure 19:
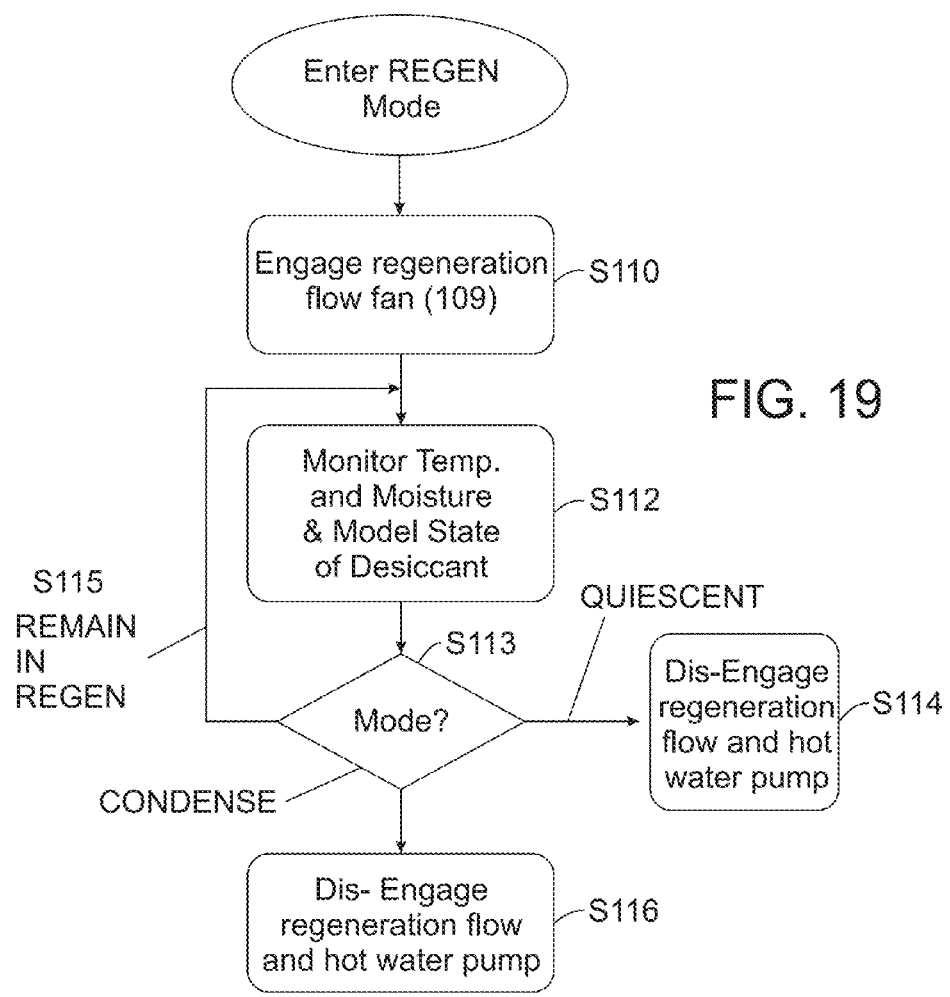
FIG. 19 is a flow chart of the actions of the system of FIG. 10 and FIG. 11 in the quiescent mode.

In FIG. 19 the steps of Regen mode are seen. First, the regeneration, recirculation fan 109 is energized and engaged S110. In this same step, the pump 108 is engaged. Then a loop is entered where the temperature sensors and moisture sensors are monitored and the information used to continually update a model of the state of the desiccant subsystem and the relative humidity of the chambers S112. Within this loop the criteria described above regarding causes of state transitions is reevaluated S113. If the conditions are such as to cause a transition to the Quiescent state, the regeneration fan and hot water pump are dis-engaged and the Quiescent state is entered S114. However if conditions dictate a transition to the Condense state, the regeneration fan and hot water pump are dis-engaged and the Condense state is entered S116. If no transition is called for by the conditions, the loop continues S115.

Further, More Detailed Embodiments

Although those skilled in the art will understand the materials and techniques used in the design and construction of systems according to these teachings, two specific implementations are described below.

Split System

Figure 20:
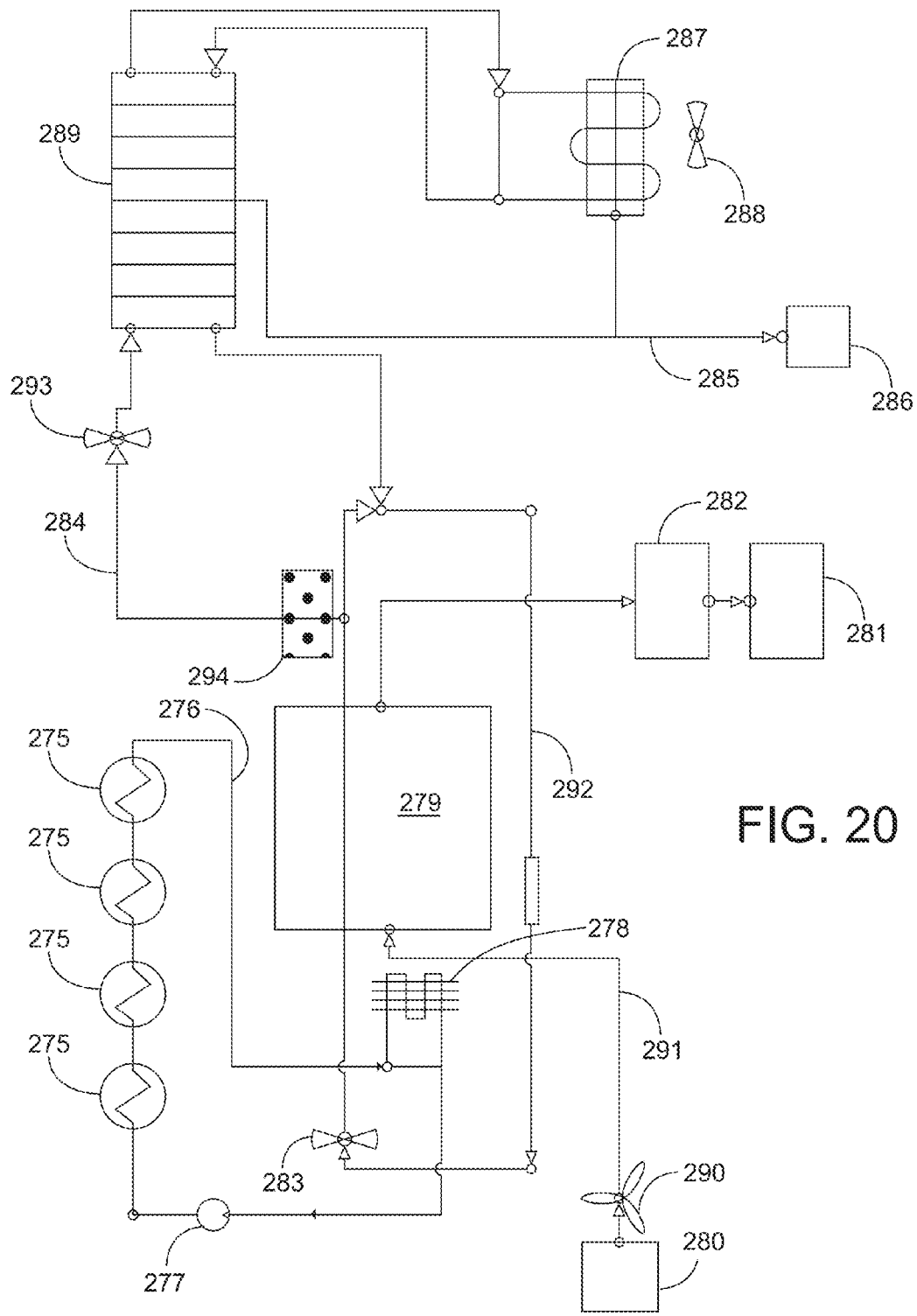
FIG. 20 illustrates an embodiment of a split system air-to-water system.

The version diagramed in FIG. 20 is a "split system" in that the subcomponents of the system may be located other than immediately adjacent to each other. Because of this flexibility a wide range of physical embodiments are possible by one skilled in the field. This specific version gets much of its energy input from solar and wind power.

Solar collectors 275, possibly located on a roof, are used to create a heated fluid 276 which a circulating pump 277 can bring to a heat exchanger 278 in a chamber with the desiccant stack 279 in a charging mode. Air is pushed in a charging flow 291 by the charge blower 290 from an inlet charge port 280, through the heat exchanger 278, and then through the stack out to a roof-mounted passive exhaust fan 281. A controlled damper 282 opens this path in a charge mode.

For regeneration, a fan 283 forces airflow 292 through the desiccant stack 279 in a continued loop. As detailed above, regeneration continues until a desired set of conditions causes a mode transition to a condensing mode. In the condensing mode, the regeneration flow path is diverted through a filter 294 into a condensing airflow path 284. This condensing airflow is caused by the condensing fan 293. The condensed water goes to a drain 285 and out an outlet 286. The condensation is promoted by a primary condenser 287 being cooled by a fan 288. That primary condenser provides a flow of a cold fluid to the heat reclaiming condenser 289.

Small Unit with Membrane

Figure 21:
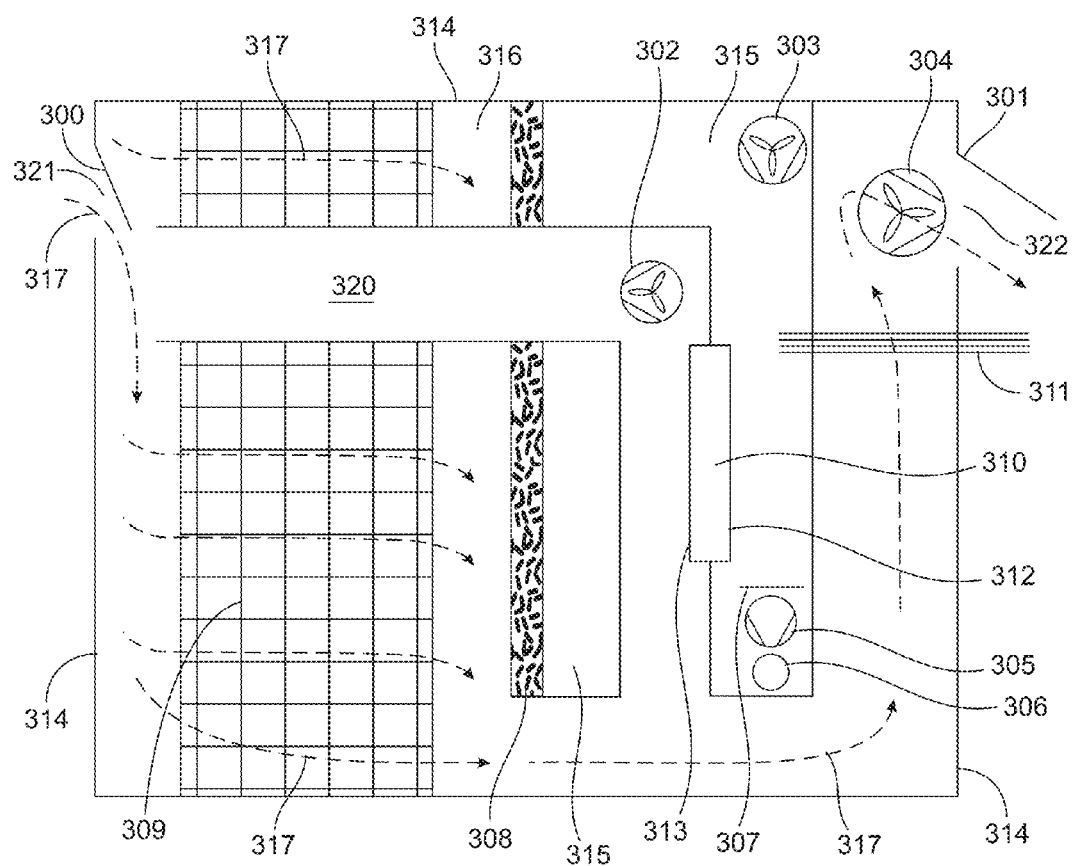
FIGS. 21-23 illustrate a compact embodiment of an air-to-water system with a membrane.
Figure 22:
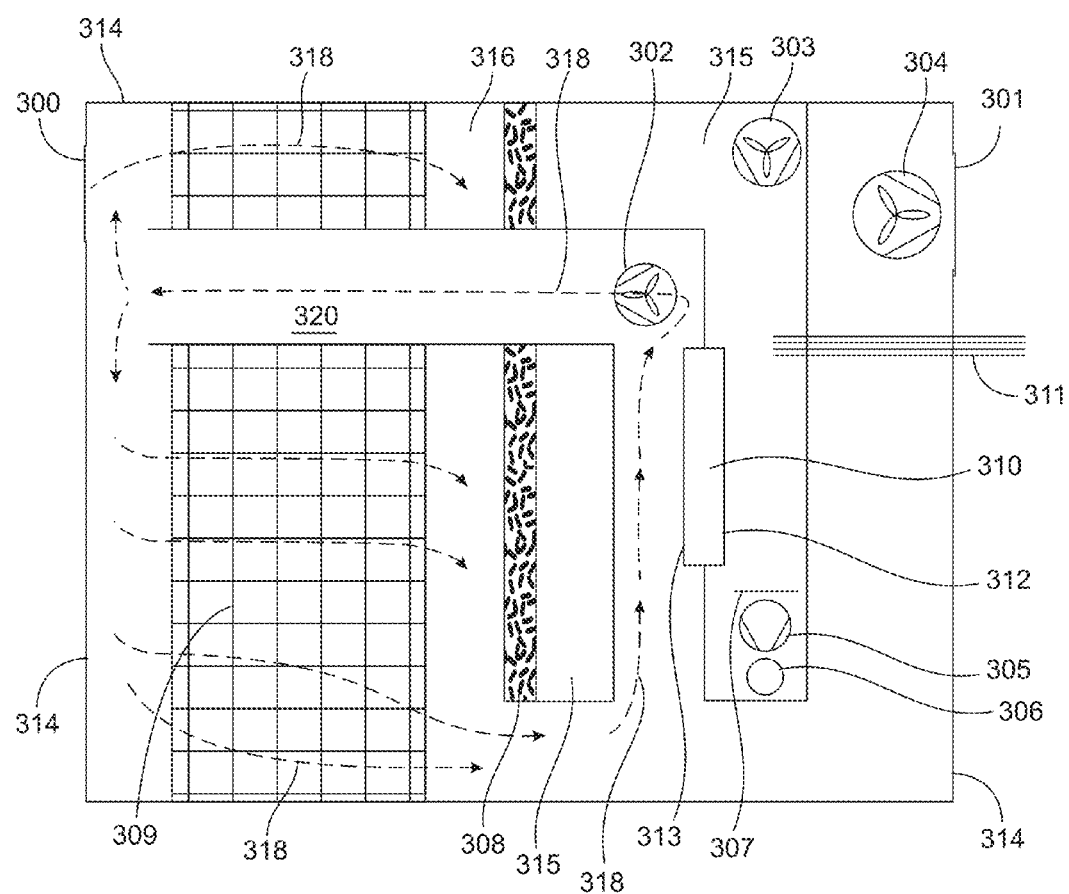
Figure 23:
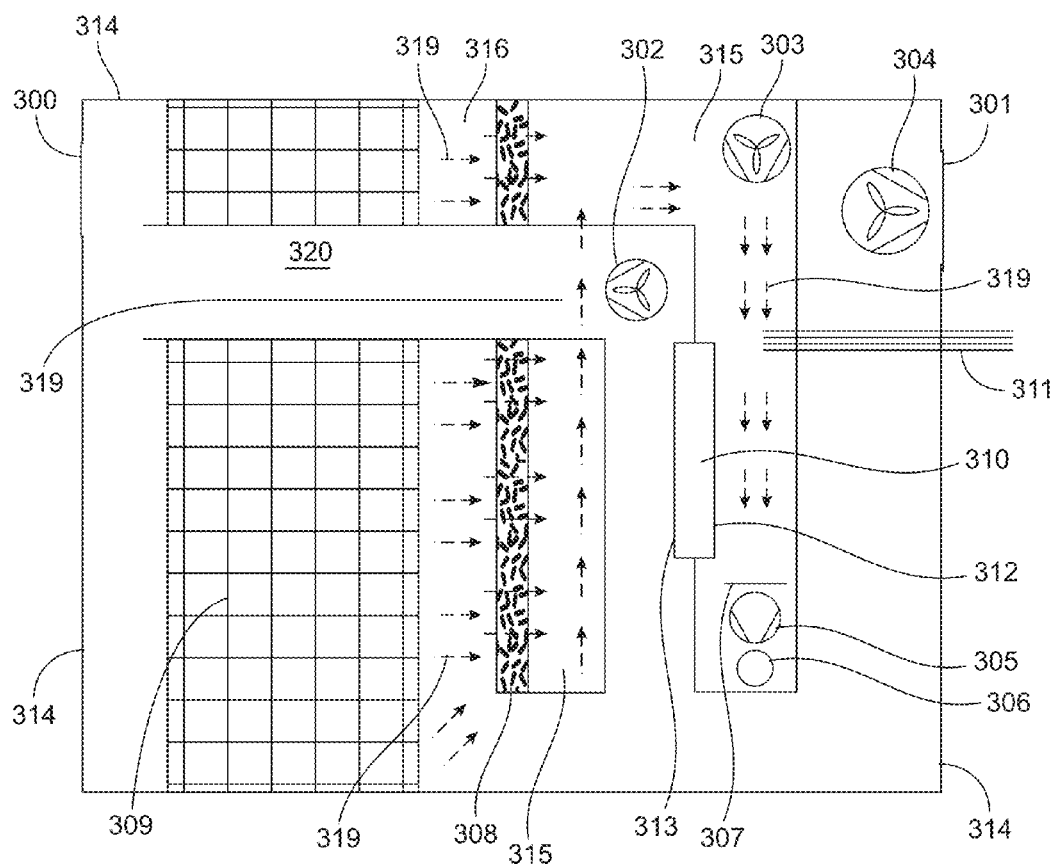

One compact embodiment using a thermoelectric semiconductor 310 is shown in simplified two-dimensional form in FIGS. 21, 22, and 23. Referencing FIG. 21 its structure includes an outer enclosure 314 with several sub-chambers and air conduits 320. The major sub component with the enclosure include a desiccant stack 309 and a membrane 308 that allows water vapor but not other molecules of the air to pass. In this example, the heating for regeneration and the cooling for condensing are both caused, literally, by two-sides of the same semiconductor. When an electric current flows through the thermoelectric device 310 the by the Peltier effect, one side becomes hot 313 while the opposite side becomes cold 312. To achieve the compact design an air conduit 320 provides a path from one side of the desiccant stack 309 to the other side of the stack for the regeneration recirculating flow 318. In these two-dimensional views the conduit appears to bifurcate the stack into two regions. This is not the case. The conduit does not extend across the whole width in the third dimension. Therefore, it does not bifurcate the desiccant stack nor does it block the condensing pathway 315. The three fans shown include one fan for charging airflow 304 at the exhaust port 322, a second regeneration-recirculating fan 302 and a condensing mixing fan 303. A tray 307 at the base of the condensing area 315 provides for the collection of condensed water that can exit the unit out of the water outlet 306.

Small Unit Operation

The charging state is seen in FIG. 21. The charging exhaust fan 304 is energized. That pulls external air into the inlet, pushing open both the inlet flap 300 and the outlet flap 301. The charging flow 317 is shown coming in the inlet, flowing through the desiccant stack 309, around the side of the membrane 308 and past the condensing area. Finally, the charging air flow exits via the exhaust port. Charging leaves the desiccant stack in a water-holding state. The heat pipe does not block the exit flow since it does not extend to fill the space in the third dimension.

In FIG. 22, the regeneration flow is diagramed. In this recirculation flow 318 the inlet and outlet flaps 300 301 are closed since the exhaust fan 304 is not energized. However, the recirculating fan 302 is energized. The recirculating flow goes through the desiccant stack 309, around the membrane and back up a recirculation channel to the air conduit 320. During this mode the thermoelectric device 310 is energized to heat the recirculating air to pull the stored moisture out of the desiccant stack.

In FIG. 23, the condensing flow 319 is shown. In this mode the only energized fan is the condensing mixing fan 303. Hot, moist air is drawn from the area of the desiccant stack 309 towards one face of the membrane 308 by a partial vacuum initiated by the pump 305. The water vapor penetrates the membrane but the bulk of the air (and heat) does not. This allows the hot air to remain hot to continue regeneration, while the water proceeds to the condensing area. As the water vapor emerges from the opposite side of the membrane, the partial vacuum is reinforced, further enhancing the "pull" of moisture through the membrane and reducing the work required by the pump. The hot water vapor first passes through an area that provides initial cooling in a passive manner via a heat pipe 311. The heat pipe extends to the outside of the enclosure 314. Then the partially cooled water vapor is actively cooled by the cold side 312 of the thermoelectric device 310. As mentioned above, a shelf 307 holds the condensed water until it is brought out of the unit by action of the pump 305.

Those skilled in the art will be aware of materials, techniques and equipment suitable to produce the example embodiments presented as well as variations on the those examples. Alternate materials that can be used for the sheet substrate include: microfiber, woven or nonwoven bamboo, or cotton, or hemp, woven or nonwoven stainless, woven or nonwoven propylene. This teaching is presented for purposes of illustration and description but is not intended to be exhaustive or limiting to the forms disclosed. Many modifications and variations will be apparent to those of ordinary skill in the art. The embodiments and versions help to explain the principles of the invention, the practical application, and to enable others of ordinary skill in the art to understand it. Various embodiments with various modifications as are suited to the particular application contemplated are expected.

In the following claims, the words "a" and "an" should be taken to mean "at least one" in all cases, even if the wording "at least one" appears in one or more claims explicitly. The scope of the invention is set out in the claims below.

It is claimed:

1. A gas drying and water producing system comprising:
   (a) a desiccant subsystem;
   (b) a main chamber containing said subsystem and so configured as to provide at least one path for airflow from outside said main chamber, into said main chamber, through the desiccant subsystem and through an exit of said main chamber;
   (c) a second, heating chamber, said heating chamber in fluid communication with said main chamber such that a heat-circulating path is selectively enableable between said chambers, said enableable path allowing a heat circulating flow through said heating chamber into said main chamber, through said desiccant subsystem and back to said heating chamber;
   (d) the system further comprising a third condensing chamber selectively in gaseous communication with said main chamber; said enableable path allowing a cooling circulating flow through said condensing chamber into said main chamber, through said desiccant subsystem and back to said condensing chamber;
   (e) a control system configured to place the system into one of at least four states comprising: quiescent, charging, condensing and regenerating, the control system configured to make state changes upon detecting an occurrence of one or more predetermined relationships between at least a modeled dew point within the desiccant subsystem, the temperature and humidity of the system's ambient environment, the temperature of a heat source for the heating chamber, and of the temperature of a cold source for the condensing chamber.

2. The system of claim 1 further comprising a fourth, separating chamber selectively in gaseous communication with said main chamber, or optionally with said heating chamber; said separating chamber having at least a portion of at least one of its enclosing walls comprised of one side of a planar semi-permeable element.

3. The system of claim 2 with said separating chamber being so configured as to provide for a sweeping flow substantially parallel to the semi-permeable element's major plane and wherein the semi-permeable element forms at least a portion of an enclosing wall of a condensing chamber.

4. The system of claim 3 wherein said semi-permeable element substantially comprises a membrane that differentially allows passage of water vapor to a greater extent than it allows passage of molecules of nitrogen.

5. The system of claim 2 with said separating chamber being so configured as to provide for an air flow substantially normal to the semi-permeable element's major plane and wherein the semi-permeable element forms at least a portion of an enclosing wall of a condensing chamber.

6. A system for producing water from air comprising:
   a) a desiccant;
   b) means for directing a flow of air through said desiccant such that a turbulent airflow results and moisture in the air is captured by the desiccant;
   c) means for providing a first flow in a closed-loop path of heated air through the desiccant for extracting the moisture;
   d) means for providing a second closed-loop flow causing moisture to condense into liquid water in a distinct third chamber;
   e) means for controlling the system for efficient operation using external air moisture and temperature data and a modeled dew point of the desiccant.

7. A method of operating a gas drying, water producing, system comprising, in any operative order:
   a) opening an intake port and an exhaust port for a desiccant chamber and forcing ambient air from the intake port through the desiccant chamber and out the exhaust port;
   b) closing ports, and ceasing air forcing when a predetermined relationship exists between the ambient air moisture level and a modeled dew point of the desiccant;
   c) opening at least two chamber-to-chamber ports coupling the desiccant chamber to a distinct condensing chamber and forcing air to recirculate around a path through the desiccant chamber, into the condensing chamber and back through the desiccant chamber while applying a relative cold source in the condensing chamber and producing and extracting liquid water, this step initiated upon detecting a predetermined relationship between the dew point and held moisture level of the desiccant chamber and the temperature of a relative heat source are favorable to efficient extraction of liquid water;
   d) closing ports, and ceasing air forcing when a predetermined relationship exists between the temperature of the cold source and the temperature and modeled dew point of the desiccant;
   e) opening at least two chamber-to-chamber ports coupling the desiccant chamber to a distinct regenerating chamber and forcing air to recirculate around a path through the desiccant chamber, into the recirculating chamber and back through the desiccant chamber while applying a relative heat source in the regenerating chamber;
   f) closing ports, and ceasing air forcing when a predetermined relationship exists between the temperature of the heat source and the temperature and modeled dew point of the desiccant;
   g) remaining in a quiescent state with ports closed and no air being forced until a predetermined relationship exists between the modeled dew point of the desiccant, the temperature of the ambient air, and the humidity of the ambient air that is favorable to efficiently increasing the charge of the desiccant.

8. The method of claim 7 where the heat source is solar.

* * * * *